United States Patent
Parks et al.

(10) Patent No.: US 11,681,345 B2
(45) Date of Patent: Jun. 20, 2023

(54) POWERED DEVICE ELECTRICAL DATA MODELING AND INTELLIGENCE

(71) Applicant: Sapient Industries, Inc., Philadelphia, PA (US)

(72) Inventors: Samuel M. Parks, Philadelphia, PA (US); Derek Horkel, Oreland, PA (US)

(73) Assignee: Sapient Industries, Inc., Philadelphia, PA (US)

(*) Notice: Subject to any disclaimer, the term of this patent is extended or adjusted under 35 U.S.C. 154(b) by 0 days.

(21) Appl. No.: 17/372,789

(22) Filed: Jul. 12, 2021

(65) Prior Publication Data

US 2022/0011840 A1    Jan. 13, 2022

Related U.S. Application Data

(60) Provisional application No. 63/050,276, filed on Jul. 10, 2020.

(51) Int. Cl.
*G06F 1/00* (2006.01)
*G06F 1/28* (2006.01)
(Continued)

(52) U.S. Cl.
CPC ............. *G06F 1/28* (2013.01); *G06F 1/3206* (2013.01); *G06F 1/3287* (2013.01)

(58) Field of Classification Search
CPC ........ G06F 1/28; G06F 1/3206; G06F 1/3287; G06F 1/266
See application file for complete search history.

(56) References Cited

U.S. PATENT DOCUMENTS

2011/0172504 A1*  7/2011  Wegerich ............. A61B 5/7264
                                                        600/301
2016/0218509 A1*  7/2016  Paul ........................ H02J 3/14
(Continued)

FOREIGN PATENT DOCUMENTS

| CN | 1157022 C | 7/2004 |
| CN | 109599939 A | 4/2019 |
| WO | 2015147455 A1 | 10/2015 |

OTHER PUBLICATIONS

International Search Report and Written Opinion mailed in corresponding international application No. PCT/US2021/041237 dated Oct. 14, 2021.

*Primary Examiner* — Nitin C Patel
(74) *Attorney, Agent, or Firm* — Young Basile Hanlon & MacFarlane, P.C.

(57) ABSTRACT

A powered device electrical data modeling and intelligence system is used to monitor electrical data of powered devices to determine in-use activity thereof. A number of network-enabled electric plugs are deployed in a region, for example, within certain areas of a floor of a building or within certain floors of a building. Each of the network-enabled electric plugs is configured to deliver electricity from an electricity source to one or more powered devices located in the region. A server runs a web application used to monitor electrical data for the region based on electricity drawn by each of the one or more powered devices. The web application computes usage metrics for the powered devices by modeling electrical data for the powered devices into clusters representative of device operational states. The web application may then determine an operational state of a powered device according to the usage metrics.

18 Claims, 7 Drawing Sheets

(51) Int. Cl.
*G06F 1/3287* (2019.01)
*G06F 1/3206* (2019.01)

(56) References Cited

U.S. PATENT DOCUMENTS

2017/0010661 A1* 1/2017 Yang ................... H01R 13/713
2017/0256941 A1* 9/2017 Bowers ............. H02J 13/00004

* cited by examiner

POWERED DEVICE ELECTRICAL DATA MODELING AND INTELLIGENCE

CROSS-REFERENCE TO RELATED APPLICATION(S)

This disclosure claims the benefit of U.S. Provisional Application Ser. No. 63/050,276, filed on Jul. 10, 2020, the disclosure of which is herein incorporated in its entirety.

TECHNICAL FIELD

This disclosure relates to powered device electrical data modeling and intelligence, in particular, to a system for modeling and intelligently applying usage metrics derived from electrical data of powered devices.

BACKGROUND

Buildings may include large numbers of devices powered by electricity. Many buildings include meters for measuring amounts of electricity drawn by those powered devices. In some cases, those powered devices may be receiving electricity even when not in use, resulting in potentially considerable electrical waste.

SUMMARY

Disclosed herein are, inter alia, implementations of systems and techniques for powered device electrical data modeling and intelligence.

In one implementation, a method includes determining common values of electrical data collected for a powered device, identifying a first cluster representing a lowest value of the common values of the electrical data in which the first cluster corresponds to a first operational state of the powered device, identifying a second cluster representing another value of the common values of the electrical data in which the second cluster corresponds to a second operational state of the powered device, determining usage metrics representing usage activity of the powered device based on the first cluster and the second cluster, and outputting the usage metrics for storage or further processing.

In another implementation, a system includes a network-enabled electric plug and a server device. The network-enabled electric plug is configured to deliver electricity from an electricity source to a powered device. The server device runs a web application in communication with the network-enabled electric plug and configured to determine common values of electrical data collected for the powered device, determine two or more clusters corresponding to operational states of the powered device based on the common values, determine usage metrics representing usage activity of the powered device based on the two or more clusters, and output the usage metrics for storage or further processing.

In yet another implementation, a non-transitory computer readable medium stores instructions operable to cause one or more processors to perform operations including determining two or more clusters corresponding to operational states of a powered device based on common values of electrical data collected for the powered device, and outputting usage metrics representing usage activity of the powered device and determined based on the two or more clusters for storage or further processing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
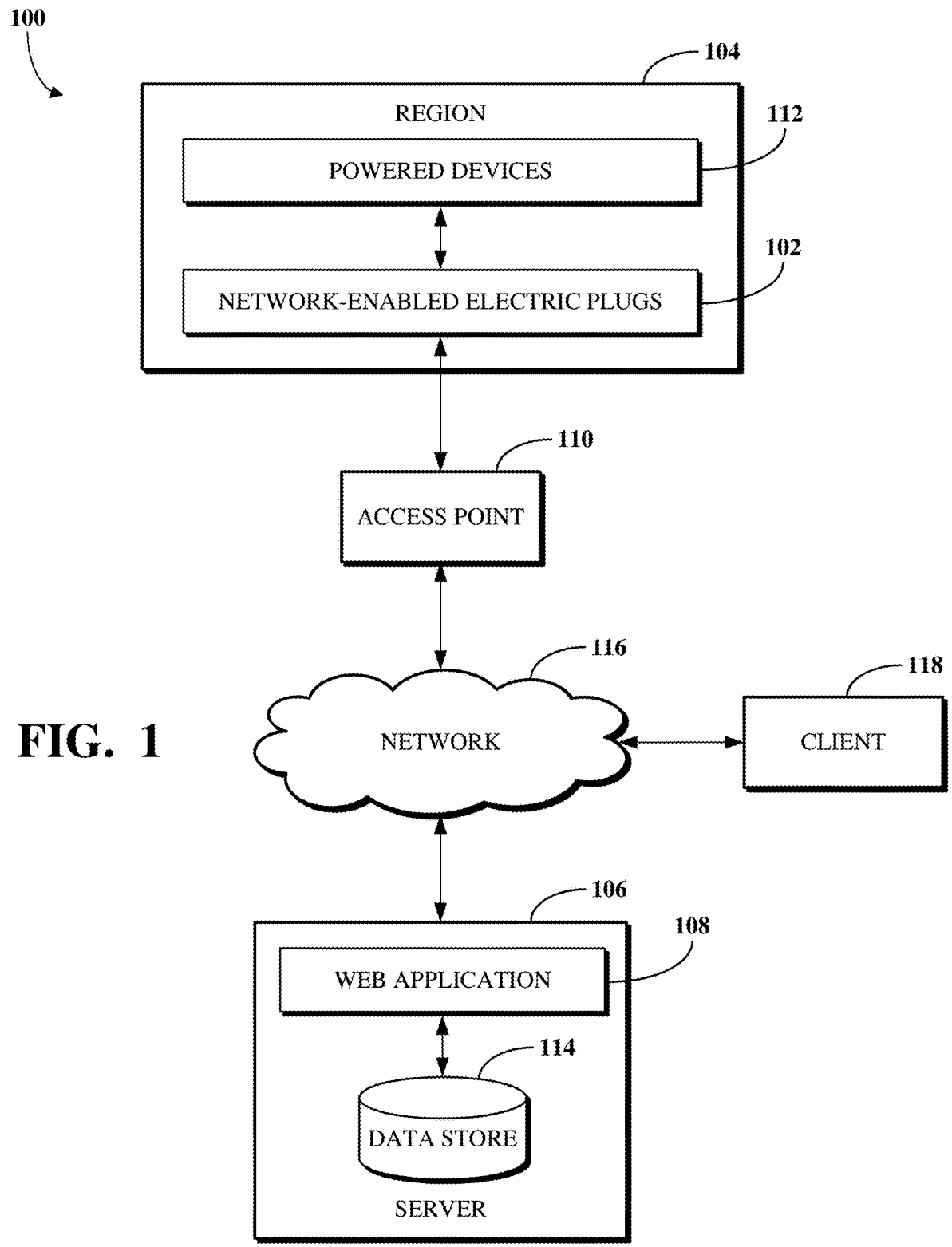
FIG. 1 is a block diagram of an example of a system for powered device electrical data modeling and intelligence.

Electrical monitoring has long been used to monitor electrical usage across an electric grid. For example, a building may have a metered circuit, which monitors a total amount of electricity used by the various devices connected to the circuit within the building. However, the portions of a building for which electricity is supplied using the metered circuit are not configurable. As such, once the metered circuit is installed, it is difficult and generally impractical to reconfigure. Some conventional techniques for electrical monitoring may also include monitoring electrical data for individual devices. However, determining collective electrical data for multiple devices requires manually collecting and combining the electrical data for each of the individual devices.

In some cases, a system may connect to powered devices within a building or portion thereof and use network-enabled plugs to measure electrical data, such as amounts of drawn electricity, for those powered devices. For example, the system may include a platform which receives the measured electrical data and processes it to deliver analytical output relating to a business' electrical utilization. The business may use the analytical output to update its powered device usage, for example, by deciding to use fewer devices or by causing the powered devices to operate at only set times, such as which may, in some cases, be selectively configurable using a network-enabled plug coupled to a given powered device.

However, simply measuring amounts of electrical data by a given powered device may not accurately represent the actual electrical requirements for the operation of the powered device. That is, a powered device may at any given time be in one of a number of operational states, and each operational state may require or otherwise use a different amount electricity. For example, a powered device may have "off" and "on and in-use" states, in which the powered device uses more electricity in the "on and in-use" state than in the "off" state. In another example, a powered device may have "off," "on but not in-use," and one or more "on and in-use" states, in which the powered device uses more electricity in an "on and in-use" state than in the "on but not in-use" state and uses more electricity in the "on but not in-use" state than in the "off" state. In either case, a given measurement of electrical data will not itself indicate the operational state of a powered device. This may be because the powered device uses different amounts of electricity at different times even within a single operational state. Thus, current technical solutions for measuring electrical usage for devices fail to accurately represent the actual electrical requirements for the operation of those devices.

Implementations of this disclosure address problems such as these by deriving usage metrics from electrical data of powered devices registered with or otherwise connected to an electrical intelligence platform. In particular, the implementations of this disclosure describe modeling powered device electrical data to determine operational states of powered devices. Electrical data for a powered device is collected over a period of time and processed using a kernel density estimation to identify the most common energy values within the electrical data. Each of the most common energy values corresponds to a "cluster" and is inferred to correspond to a different operational state of the powered device. In some cases, the electrical data is modeled into two clusters in which the lowest cluster, representing the lowest common energy value identified by the kernel density estimation, is inferred to correspond to an "off" state and the other is inferred to correspond to an "on and in-use" state. In other cases, the electrical data is modeled into three or more clusters in which the lowest cluster is inferred to correspond to an "off" state, the second lowest is inferred to correspond to an "on but not in-use" state, and each other cluster is inferred to correspond to an "on and in-use" state. The modeling is performed for each device in communication with a powered device electrical data modeling and intelligence platform.

The usage metrics are inferences produced as a result of processing electrical data collected over time for powered devices. The implementations of this disclosure thus improve upon existing technical solutions for electrical data measuring by enabling a user of a powered device electrical data modeling and intelligence platform to understand whether their devices are actively in-use at a given time. That is, by correlating electrical data to one of the modeled clusters, an operational state of a powered device can be effectively determined, which operational state represents whether the powered device is "off," "on but not in-use," or "on and in-use," in which the "off" and "on but not in-use" states both indicate the powered device as being not in-use and the "on and in-use" state indicates the powered device as being in-use. As used herein, the term "in-use" refers to a given powered device being actively operated, controlled, or otherwise used, whether by someone being physically present at the powered device or virtually present at the powered device, such as over a remote network connection established between the powered device and another device.

However, these usage metrics may also be used in many other ways to further optimize electrical management for the powered devices of the user. For example, the usage metrics may be used to identify the device type of the powered device for which the clusters were modeled, such as based on inferences of average power amounts when the powered device is "on and in-use," maximum power amounts when it is "on and in-use," or average power amounts when it is "on but not in-use." In another example, the usage metrics may be used to provide insight into the impact of a powered device to a user's business operation, such as based on inferences of how often the powered devices is actually "on and in-use," which can be of significant value to the user when deciding whether to renew a lease agreement for the powered device or to purchase more powered devices. In yet another example, the usage metrics may be used to infer occupancy insights for a region, such as by inferring where people are based on where powered devices determined to be "on and in-use" are at a given time, which can be useful for business purposes such as deriving insights on employee activity and also for purposes of coordinating an emergency response strategy and measuring employee compliance with such strategies. In still a further example, the usage metrics may be used for predictive maintenance of powered devices, such as based on inferences from observing trends or changes in the expected behavior (e.g., changes in established electrical data patterns over time) of powered devices which signal potential faults of the powered devices in the future.

To describe some implementations in greater detail, reference is first made to examples of hardware and software structures used to implement a powered device electrical data modeling and intelligence system. FIG. 1 is a block diagram of an example of a system 100 for powered device electrical data modeling and intelligence. The system 100 includes a number of network-enabled electric plugs 102 located within a region 104, a server 106 that runs a web application 108, and a gateway 110 intermediary to the region network-enabled electric plugs 102 and the web application 108.

The network-enabled electric plugs 102 are electric plugs used to deliver electricity from electrical sources to powered devices 112 located in the region 104. An input of a network-enabled electric plug 102 can be connected to an electrical source and a powered device 112 can be connected to an output of the network-enabled electric plug 102. For example, the input of a network-enabled electric plug 102 can be or include a number of plug blades (e.g., according to geographic electric plug standards), and the output of the network-enabled electric plug 102 can be or include a socket. The plug blades of the network-enabled electric plug 102 can be connected into a socket of an electrical source and the plug blades of a powered device 112 can be connected to the socket of the network-enabled electric plug 102.

The region 104 is a physical area within which the powered devices 112 operate and electrical data of the powered devices 112 is configured, controlled, and monitored. The region 104 may refer to a building, one or more floors of a building, one or more rooms of one or more floors of a building, or another area. That is, without limitation, other areas may represent regions for which electrical data may be configured, controlled, and monitored according to this disclosure. For example, a region may include a portion of a room, multiple rooms, a portion or all of a suite, multiple suites, another portion of a floor of a building, multiple floors of a building, multiple portions of multiple floors of a building, and so on.

An electrical source refers to a source of electricity that may be delivered to the powered device 112, such as with or without using the network-enabled electric plugs 102. As such, an electrical source may, for example, include an electrical output (e.g., a wall outlet or other outlet to which an electrical device may conventionally be plugged into) or another source of electricity.

A powered device 112 refers to a device, component, element, machine, or other thing which receives electrical power. Examples of powered devices 112 include, but are not limited to, computers (e.g., desktops, laptops, tablets, game consoles, etc.), computer-related devices (e.g., routers, modems, network switches, speakers, monitors, etc.), kitchen appliances (e.g., refrigerators, microwaves, stoves, ovens, etc.), lighting units (e.g., desktop lamps, floor lamps, etc.), temperature control machines (e.g., furnaces, air conditioners, fans, etc.), and communication devices (e.g., desktop phones, cell phones, etc.).

There may be one or more network-enabled electric plugs 102 located in the region 104 at a given time. As such, there may also be one or more powered devices 112, and, further, one or more electrical sources, in the region 104 at a given time.

The server 106 is a computing aspect that runs the web application 108. The server 106 may be or include a hardware server (e.g., a server device), a software server (e.g., a web server and/or a virtual server), or both. For example, where the server 106 is or includes a hardware server, the server 106 may be a server device located in a rack, such as of a data center.

The web application 108 is application software used to configure, monitor, and control the operation of the network-enabled electric plugs 102. For example, the web application 108 can be used to deploy the network-enabled electric plugs 102 within the region 104, such as to configure the network-enabled electric plugs 102 for use in delivering electricity to the powered devices 112 and to configure the network-enabled electric plugs 102 to report electrical data of the powered devices 112. In another example, the web application 108 can be used to monitor the electrical data of the powered devices 112, such as based on the amount of electricity delivered to the powered devices 112 by the network-enabled electric plugs 102 and/or based on the times at which the network-enabled electric plugs 102 deliver electricity to the powered devices 112.

In yet another example, the web application 108 can be used to selectively control the operation of the network-enabled electric plugs 102, such as based on the monitored electrical data of the powered devices 112. For example, the web application 108 can be used to selectively control the operation of the network-enabled electric plugs 102 by limiting times at which the network-enabled electric plugs 102 can deliver electricity to the powered devices 112 and/or limiting loads of electricity which may be delivered by the network-enabled electric plugs to the powered devices 112. For example, the web application 108 can selectively control the operation of the network-enabled electric plugs 102 according to usage metrics indicating the in-use activity of the powered devices 112.

The web application 108 accesses a data store 114 on the server 106 to perform at least some of the functionality of the web application 108. The data store 114 is a file store, database, or other data store used to store, manage, or otherwise provide data used to deliver functionality of the web application 108. For example, the data store 114 may be a file-based storage aspect which stores data in a hierarchical or other structure. In another example, the data store 114 may be a relational database management system, an object database, an XML database, a configuration management database, a management information base, one or more flat files, other suitable non-transient storage mechanisms, or a combination thereof.

The gateway 110 is a computing aspect used to communicate information and/or commands between the network-enabled electric plugs 102 and the web application 108. The gateway 110 may be or include network hardware, such as a router, a switch, a load balancer, another network device, or a combination thereof. The gateway 110 may receive information and/or commands from and/or transmit information and/or commands to the network-enabled electric plugs 102 using one or more network protocols, such as using Ethernet, TCP, IP, power line communication, Wi-Fi, Bluetooth®, infrared, GPRS, GSM, CDMA, Z-Wave, Zig-Bee, LoRaWAN, another protocol, or a combination thereof.

The gateway 110 communicates with the web application 108 over a network 116. The network 116 may, for example, be a local area network, a wide area network, a machine-to-machine network, a virtual private network, or another public or private network.

A client 118 may be given access to the web application 108. For example, the client 118 be a mobile device, such as a smart phone, tablet, laptop, or the like. In another example, the client 118 may be a desktop computer or another non-mobile computer. The client 118 may run a software application (e.g., client-side application software) to communicate with the web application 108. For example, the software application may be a mobile application that enables access to some or all functionality and/or data of the web application 108. The client 118 communicates with the server 106 over the network 116.

Implementations of the system 100 may differ from what is shown and described with respect to FIG. 1. In some implementations, the gateway 110 may be omitted. For example, the network-enabled electric plugs 102 may be configured to communicate with the web application 108 over the network 116 using a long range, low power system or another communication mechanism. In some implementations, the gateway 110 may be located in the region 104. In some implementations, the gateway 110 may include or otherwise use a firewall, for example, to prevent listening or data access to communicated information by other than the network-enabled electric plugs 102 or the web application 108.

In some implementations, such as where the web application 108 is used to control and monitor electrical data for powered devices in multiple regions, the gateway 110 may communicate information between the web application 108 and network-enabled electric plugs located in multiple regions. For example, where multiple regions are defined as different areas of a floor of a building, the gateway 110 may be centrally or otherwise positioned to operate with the network-enabled electric plugs in each of those areas. The different areas are typically non-overlapping in that the deployment of each network-enabled electric plug is limited to a single region. However, in some cases, the different areas may overlap, such as where one or more of the powered devices is shared between two or more of those regions.

Figure 2:
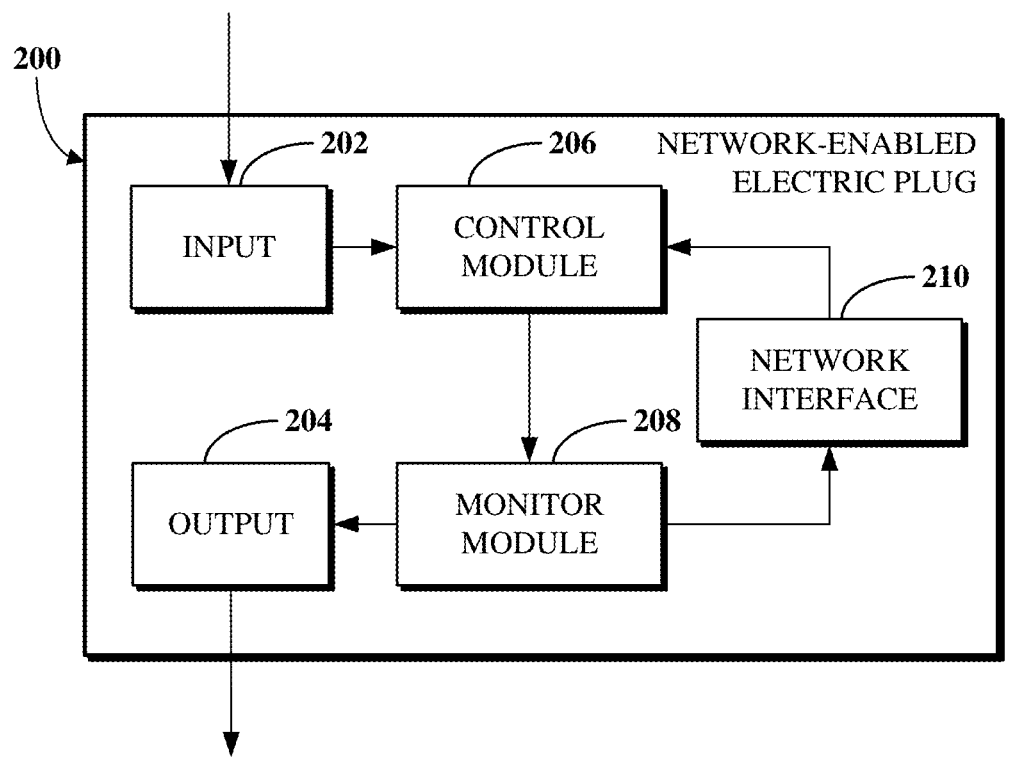
FIG. 2 is a block diagram showing an example of a network-enabled electric plug.

FIG. 2 is a block diagram showing an example of a network-enabled electric plug 200. The network-enabled electric plug 200 may, for example, be one of the network-enabled electric plugs 102 shown in FIG. 1. The network-enabled electric plug 200 includes an input 202, an output 204, a control module 206, a monitor module 208, and a network interface 210.

The input 202 receives electricity, such as from an electrical source. The output 204 delivers electricity, such as to a powered device (e.g., one of the powered devices 112 shown in FIG. 1). The input 202 may be a hardware component, for example, one or more blades which may be inserted into a socket of an electrical source. Alternatively, the input 202 may be a software component, such as instructions for directing electricity from the electrical source to the control module 206. As a further alternative, the input 202 may include a hardware component and a software component.

Similarly, the output 204 may be a hardware component, for example, a socket which may receive one or more blades of a powered device. Alternatively, the output 204 may be a software component, such as instructions for directing electricity to the powered device from the control module 206. As a further alternative, the output 204 may include a hardware component and a software component.

The control module 206 can control the delivery of electricity from the network-enabled electric plug 200, such as via the output 204. For example, the network-enabled electric plug 200 can be configured to limit deliver electricity to a connected powered device, such as based on time of day, amount of electricity drawn via the input 202, both, or other bases. Configuring the network-enabled electric plug 200 to limit delivery of electricity to a connected powered device can include asserting rules for electricity delivery against the network-enabled electric plug 200.

The control module 206 can maintain and/or use a list of asserted rules to determine whether to allow delivery of electricity from the input 202 through to the output 204. For example, the network-enabled electric plug 200 may be included in a system for powered device electrical data modeling and intelligence (e.g., the system 100 shown in FIG. 1). The system for powered device electrical data modeling and intelligence may further include a web application (e.g., the web application 108 shown in FIG. 1).

The web application may include functionality for generating rules used to selectively control the delivery of electricity from the input 202 through to the output 204, for example, based on electrical data of a powered source that receives electricity from the output 204 of the network-enabled electric plug 200. The electrical data of the powered source can be monitored, for example, using the monitor module 208. Thus, the electrical data of the powered device can refer to the electricity delivered to the powered device via the output 204.

The monitor module 208 includes or otherwise uses a hardware component and/or a software component to monitor electricity delivered from the input 202 through to the output 204. For example, the monitor module 208 can include or otherwise use a power meter with one or more sensors to measure electricity delivered from the input 202 through to the output 204. In another example, the monitor module 208 can include or otherwise use a clock to monitor times at which electricity is delivered from the input 202 through to the output 204. The clock may be internal to the network-enabled electric plug 200. Alternatively, the clock may be external to the network-enabled electric plug 200, such as where the network-enabled electric plug 200 uses time information from a server or another device.

The control module 206 can include or otherwise use a hardware component and/or a software component to selectively allow delivery of electricity from the input 202 through to the output 204. For example, a hardware component included in or otherwise used by the control module 206 can be or include a conductor used to selectively open and close a circuit for delivering the electricity from the input 202 through to the output 204. In another example, a software component included in or otherwise used by the control module 206 can include instructions, such as programmed into an integrated circuit, for selectively opening and closing a circuit for delivering the electricity from the input 202 through to the output 204. The physical chip of the integrated circuit may, in at least some cases, be considered a hardware component.

The network interface 210 is used to transmit information and/or commands to and/or receive information and/or commands from one or more devices external to the network-enabled electric plug 200. The network interface 210 provides a connection or link to a network (e.g., the network 116 shown in FIG. 1). The network interface 210 can be a wired network interface or a wireless network interface. The network-enabled electric plug 200 can communicate with other devices via the network interface 210 using one or more network protocols, such as using Ethernet, TCP, IP, power line communication, Wi-Fi, Bluetooth, infrared, GPRS, GSM, CDMA, Z-Wave, ZigBee, LoRaWAN, another protocol, or a combination thereof.

For example, the network interface 210 can be used to transmit information indicative of monitored electrical data of a powered device connected to the network-enabled electric plug 200. The monitor module 208 can make the information indicative of monitored electrical data of the powered device available to, for example, the web application of the system for powered device electrical data modeling and intelligence using the network interface 210.

In another example, the network interface 210 can be used to receive commands to assert certain rules for selectively controlling the delivery of electricity from the input 202 through to the output 404. For example, the commands can include the rules themselves, information indicative of the rules, and/or other information related to the rules. The commands can be received using the network interface 210 and then made available to the control module 206. The control module 206 can then be configured to selectively control delivery of the electricity from the input 202 based on the commands. For example, configuring the control module 206 to selectively control delivery of the electricity from the input 202 can include the control module 206 adding the rule or rules from such a command to a list of the asserted rules. The rules may be defined by usage metrics computed according to the implementations of this disclosure, such as based on times at which a powered device which receives electricity using the network-enabled electric plug 200 is determined to be in-use.

Implementations of the network-enabled electric plug 200 may differ from what is shown and described with respect to FIG. 2. In some implementations, the control module 206 and the monitor module 208 may both be included in a single combined module. For example, the combined module may both receive the input 202 and enable the output 204. In such an implementation, the combined module may also perform all data communication using the network interface 210.

In some implementations, the network-enabled electric plug 200 may include multiple outputs. For example, the output 204 may be a first output, and the network-enabled electric plug 200 may include one or more other outputs. Each output may support direct delivery of electricity to a single powered device (e.g., where the powered device is directly plugged into the output 204). As such, in such an implementation, the network-enabled electric plug 200 may enable simultaneous direct delivery of electricity to N powered devices, where N is the number of outputs of the network-enabled electric plug 200.

In some implementations, the network-enabled electric plug 200 may include a physical interface element which may be toggled or otherwise interacted with by a user. For example, the physical interface element may be a button, a switch, or another hardware element. The physical interface element may be configured to cause one or more functions to be performed based on the manner in which the physical interface element is toggled or otherwise interacted with.

For example, when the physical interface element is toggled or otherwise interacted with one time (e.g., a single push, where the physical interface element is a button), the physical interface element may cause the control module 206 to use the network interface 210 to check for updates to the rules for controlling electricity delivery via the output 204, but which may not have been pushed to the control module 206 yet.

In another example, when the physical interface element is toggled or otherwise interacted with multiple times (e.g., a double or triple push), the physical interface element may cause the control module 206 to override currently configured rules that control the electricity delivery via the output 204, such as to enable an unimpeded flow of electricity from the input 202 to the output 204 for some amount of time.

In some such implementations, the amount of time for which the flow of electricity from the input 202 to the output 204 is unimpeded based on a toggling or other interaction with a physical interface element may be unlimited, ended by user action (e.g., re-engaging the configured rules using a web application, such as the web application 108 shown in FIG. 1), or limited to a particular amount of time (e.g., 5 minutes, 10 minutes, 1 hour, or some other amount of time).

The particular action performed by a given manner of toggling or other interaction with the physical interface element may be set by default, for example, by a manufacturer of the network-enabled electric plug 200. Alternatively, a user may be able to configure the particular action performed by a given manner of toggling or other interaction with the physical interface element, for example, using a web application (e.g., the web application 108).

In some implementations, the network-enabled electric plug 200 may include multiple such physical interface elements. For example, each of the multiple physical interface elements may be configured to cause a different action to be performed. In some such implementations, the various physical interface elements may be implemented as the same or as different types of hardware elements.

Figure 3:
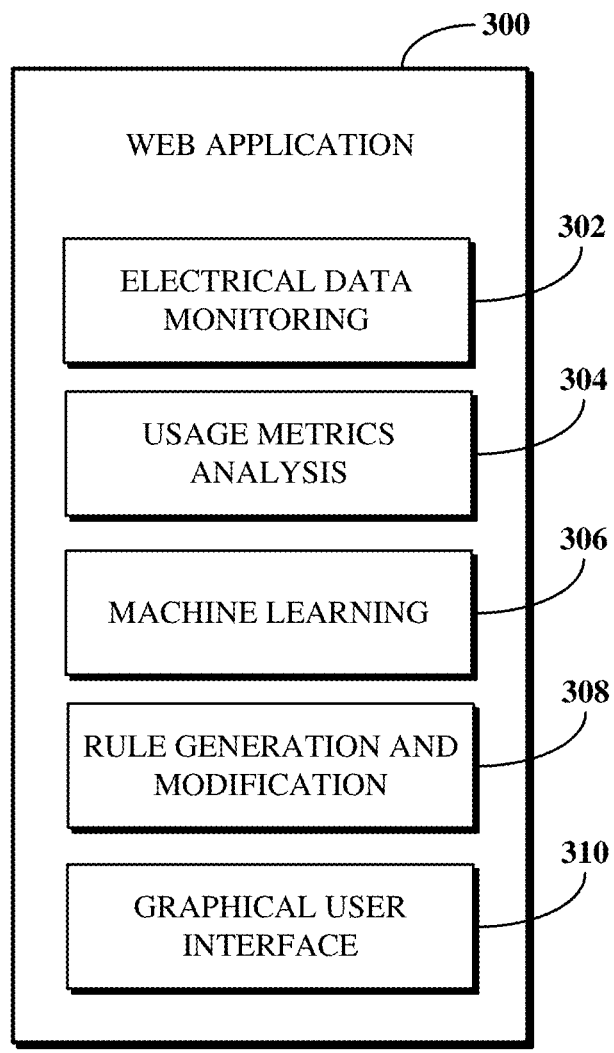
FIG. 3 is a block diagram showing examples of functionality of a web application of a powered device electrical data modeling and intelligence system.

FIG. 3 is a block diagram showing examples of functionality of a web application 300 of a powered device electrical data modeling and intelligence system. For example, the web application 300 may be the web application 108 of the system 100 shown in FIG. 1. The web application 300 include electrical data monitoring functionality 302, usage metrics analysis functionality 304, machine learning functionality 306, rule generation and modification functionality 308, and a GUI 310.

The electrical data monitoring functionality 302 monitors electrical data of powered devices connected to the network-enabled electric plugs associated with the web application 300. For example, the electrical data monitoring functionality 302 can collect electrical data for some or all of the powered devices in a region from the network-enabled electric plugs coupled to those powered devices. The electrical data indicates amounts of electricity delivered to one or more powered devices connected to each of the network-enabled electric plugs. The electrical data may be recorded in a time series format indicative of a time and date at which a given item of the electrical data is collected.

The electrical data monitoring functionality 302 may include reporting functionality, such as for reporting electrical data within one or more regions. For example, the reporting functionality can be used to generate electrical data reports for certain regions, certain powered devices (e.g., based on types or categories of the powered devices), or for other purposes. The electrical data reports can indicate electrical data over a defined period of time. For example, the reporting functionality may generate a monthly electrical data report. In some cases, the period of time for which electrical data reports are generated may be configurable.

The reporting functionality may also or instead be used to maintain and/or generate reports of key performance indicators for the electrical data within one or more regions. For example, the key performance indicators can represent measurements or goals for electrical data, such as reductions in overall electrical data for one or more specified regions during a recent time period as compared to the overall electrical data for the one or more specified regions in an earlier time period. In some cases, the particular metrics used for the key performance indicators may be configurable. In some cases, the reporting functionality of the electrical data monitoring functionality 302 may be disabled.

The usage metrics analysis functionality 304 processes the electrical data collected by the electrical data monitoring functionality 302. In particular, the usage metrics analysis functionality 304 processes the electrical data to determine usage metrics indicating whether a given powered device corresponding to the electrical data is or is likely to be in-use at a given time. The usage metrics are used to enrich the electrical data collected by the electrical data monitoring functionality 302. For example, the reporting functionality of the electrical data monitoring functionality 302 can display the in-use indications for the powered devices after the corresponding electrical data has been enriched by the usage metrics analysis functionality 304.

The electrical data processed by the usage metrics analysis functionality 304 includes time series data indicating, for each powered device for which electrical data is monitored using the electrical data monitoring functionality 302, electrical usage measurements and timestamps indicative of those electrical usage measurements. The usage metrics analysis functionality 304 processes the time series data for a given powered device by computing average electrical data values on a time series scale (e.g., over one hour, one day, one week, or another period of time) and smoothing the average electrical data values using one or more filters, such as to eliminate spikes in the data which misrepresent the average electrical data by the given powered device.

The smoothed average electrical data values are then processed to identify two or more clusters of those values. The clusters each include one or more of the smoothed average electrical data values. As such, each of the clusters corresponds to a single electrical data value representative of the one or more smoothed average electrical data values included in that cluster. The clusters may be determined using a kernel density estimation function. Each of the clusters corresponds to an operational state of the given powered device, such as "on and in-use" or "off" in cases where there are two clusters, in which the cluster corresponding to the lower electrical data value corresponds to the "off" operational state and the other corresponds to the "on and in-use" operational state. In cases where there are more than two clusters, the cluster corresponding to the lowest electrical data value corresponds to the "off" operational state, the cluster corresponding to the highest electrical data value corresponds to the "on and in-use" operational state, and the other cluster in between those two corresponds to the "on but not in-use" operational state.

The particular operational state indicated by a given electrical data value represents whether the given powered device is in-use. In particular, it may be deduced that a powered device is in-use when its electrical data has a value corresponding to a value of a highest cluster identified by the usage metrics analysis module 304. That is, by determining that the powered device is drawing an amount of electricity which has been determined to be consistent with the amount corresponding to the highest cluster identified for the powered device, the powered device can be determined to be in the "on" operational state and thus actively in-use. Similarly, by determining that the powered device is drawing a different amount of electricity consistent with a different cluster, be it the cluster corresponding to the "off" operational state or the "on but not in-use" operational state in cases in which the latter cluster exists, the powered device can be determined to not be in the "on and in-use" operational state and thus not actively in-use.

The values of the clusters can be populated within a truth table for the powered device. Further electrical data collected for the powered device may be compared against the values stored in the truth table. As a result of the comparison, a data field representing the operational state and/or the in-use status of the powered device at a time corresponding to the further electrical data can be determined.

As described above, the clustering of electrical data values is performed at the device-level, rather than at a region-level, and the processing performed to determine the usage metrics are agnostic as to the particular device for which the electrical data values are processed.

The machine learning functionality 306 includes intelligence for analyzing aspects of the web application 300 and/or of the information used in connection with the web application 300. The intelligence of the machine learning functionality 306 may use or otherwise refer to one or more of a neural network, a deep neural network, a support vector machine, a cluster network, a Bayesian network, or another machine learning approach. The machine learning functionality 306 can be used to deliver many different features of the web application 300. Examples uses of the machine learning functionality 306 are described below, noting that the examples described are non-exhaustive and that such machine learning functionality 306 may be extended as other functionality of the web application 300 is extended.

In one example, the machine learning functionality 306 may be used to auto-label electrical data collected for a powered device with a device type of the powered device. The auto-labeling uses a variety of electrical characteristics based on the usage metrics determined by the usage metrics analysis functionality 304 to determine the device type of a powered device. For example, the machine learning functionality 306 may use the usage metrics to determine the length of time the powered device is in-use over the course of a day, the periods of time during which the powered device is in-use over the day, and/or other feature information. The device type of the powered device can be inferred by the machine learning functionality 306 using that information derived from the usage metrics.

In another example, the machine learning functionality 306 may be used to analyze the usage metrics determined by the usage metrics analysis functionality 304 to determine a predictive demand for powered devices. For example, the predictive demand for a powered device can represent a forecast of electricity use by the powered device over some time period. The predictive demand for a powered device can represent actual amounts of electricity drawn (e.g., as indicated in the collected electrical data for the powered device or by the usage patterns for the powered device) projected over that time period.

In yet another example, the machine learning functionality 306 may be used to process the information collected using the electrical data monitoring functionality 302, such as to prepare that information for processing by the electrical data monitoring functionality 302 and/or other functionality of the web application 300. For example, the machine learning functionality 306 can pre-process information collected from network-enabled electric plugs associated with the web application 300. Pre-processing the information using the machine learning functionality 306 can include de-noising or otherwise processing the information to modify it into a format which may be used by the electrical data monitoring functionality 302.

The rule generation and modification functionality 308 includes functionality for generating rules used to selectively control the delivery of electricity by network-enabled electric plugs to powered devices. A rule may be generated by a user of the web application 300. Alternatively, a rule may be generated by the rule generation and modification functionality 308 using the usage metrics determined using the usage metrics analysis functionality 304. As a further alternative, a rule may be generated using the machine learning functionality 306. The web application 300 may be used to assert a number of rules generated using the rule generation and modification functionality 308.

A user of the web application 300 may generate a rule with or without reference to information collected or reported using the electrical data monitoring functionality 302. For example, a user of the web application 300 may review electrical usage information for a powered device or a region to determine whether and how to design a new rule. For example, the electrical data collected for a powered device may indicate that too much electricity is being delivered to the powered device while the powered device is not in-use. The user of the web application 300 may thus generate a rule which, when asserted against a network-enabled electric plug that delivers electricity to that particular powered device, causes such electricity delivery to be limited when the powered device is not in-use.

In another example, the user of the web application 300 may want to preemptively or proactively limit electrical usage, such as where the user does not expect a particular powered device to be used at certain times of the day and/or of the night. In such a case, the user may generate a rule which, when asserted against the network-enabled electric plug that delivers electricity to that particular powered device, causes such electricity delivery to be limited during those certain times of day and/or night.

Separately, the rule generation and modification functionality 308 may generate a rule based on the usage metrics determined using the usage metrics analysis functionality 304. For example, a rule can be generated based on usage patterns for a powered device or for multiple powered devices in a particular region. The usage patterns may represent patterns of operational states of a powered device inferred from usage metrics determined for the powered device. For example, the usage patterns may represent the operational states in a time series format so as to indicate dates and times in which the powered device is in each given operational state. A rule may be generated based on those usage patterns such as to selectively control the delivery of electricity to the powered device according to the usage metrics. For example, if the usage patterns indicate that the operational state of a powered device from Friday to Monday is "off," a rule may be generated to limit or entirely prevent the delivery of electricity to the powered device on those days.

In some cases, the machine learning functionality 306 can be used to analyze the information collected or reported using the electrical data monitoring functionality 302. The machine learning functionality 306 can then use that analysis to design a rule to be generated using the rule generation and modification functionality 308. For example, the machine learning functionality 306 may be used to generate rules based on the usage metrics determined by the usage metrics analysis functionality 304.

After a rule is generated, that rule is made available for user review before it is asserted against one or more network-enabled electric plugs associated with the web application 300. For example, the web application 300 can generate a notification for the user indicating that a new rule is available for approval. The web application 300 can transmit the notification to a client device of the user (e.g., the client 118 shown in FIG. 1) and/or include the notification in the GUI 310. In another example, the web application 300 can be configured to notify a user of new rules available for approval at certain times, such as at the beginning of a work day, at the end of a work day, when a certain number of new rules for approval have been generated, or at other times. In some cases, the requirement for rules to be user-approved before being asserted may be disabled.

The rule generation and modification functionality 308 further includes functionality for modifying a rule after the rule is generated. A rule may be modified to more accurately control the delivery of electricity to a powered device or multiple powered devices within a region based on the usage metrics determined by the usage metrics analysis functionality 304. In this way, the usage metrics can be used to enrich rules previously generated at the web application 300. For example, a rule may be initially generated to indicate that electrical delivery to a powered device should be limited between 12 and 3 PM on a given day because the information used to generate that rule indicated that the powered device is in the "off" operational state or the "on but not in-use" operational state during that time period. However, further information may be identified to clarify that the powered device is actually in an "on and in-use" operational state from 1 to 3 PM. The rule may thus be modified to limit electrical delivery to the powered device only from 12 to 1 PM instead of from 12 to 3 PM, as initially configured. In some cases, that further information identified and used to modify the rule may be further usage metrics determined for the powered device. In some cases, that further information may instead be other usage information indicating that a rule is being overridden.

The GUI 310 is a GUI which may be rendered or displayed, such as to render or display pages of the web application 300 for use. The GUI 310 can comprise part of a software GUI constituting data that reflect information ultimately destined for display on a hardware device, for example, the client 118 shown in FIG. 1). For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating the GUI 310 or another GUI on a display that can be used to generate pixel information. A structured data output of one device can be provided to an input of the hardware display so that the elements provided on the hardware display screen represent the underlying structure of the output data.

Implementations of the web application 300 may differ from what is shown and described with respect to FIG. 3. In some implementations, the web application 300 may include region definition functionality. For example, a user may use the region definition functionality to define one or more regions for which electrical data may be configured, controlled, and monitored in connection with the web application 300. The region definition functionality may include default (e.g., out-of-the box) definitions for regions, user-configured definitions for regions, or both.

In some implementations, two or more of the aspects shown in FIG. 3 may be combined, or one or more of those aspects may be omitted. For example, the usage metrics analysis functionality 304 may be combined into the electrical data monitoring functionality 302. In another example, the machine learning functionality 306 may be used in connection with other functionality of the web application 300. For example, the machine learning functionality 306 can be used to identify powered devices connected to network-enabled electric plugs associated with the web application 300, such as prior to the collection of electrical data by the electrical data monitoring functionality 302. Other examples are also possible.

In some implementations, the web application 300 can include device registration or authentication functionality. For example, the device registration or authentication functionality can include the earlier-described functionality related to identifying a device type or other category of a powered device. In another example, the device registration or authentication functionality can include functionality for registering a network-enabled electric plug with the web application 300, such as to enable permissions for the web application 300 to be used to configure the network-enabled electric plug.

Figure 4A:
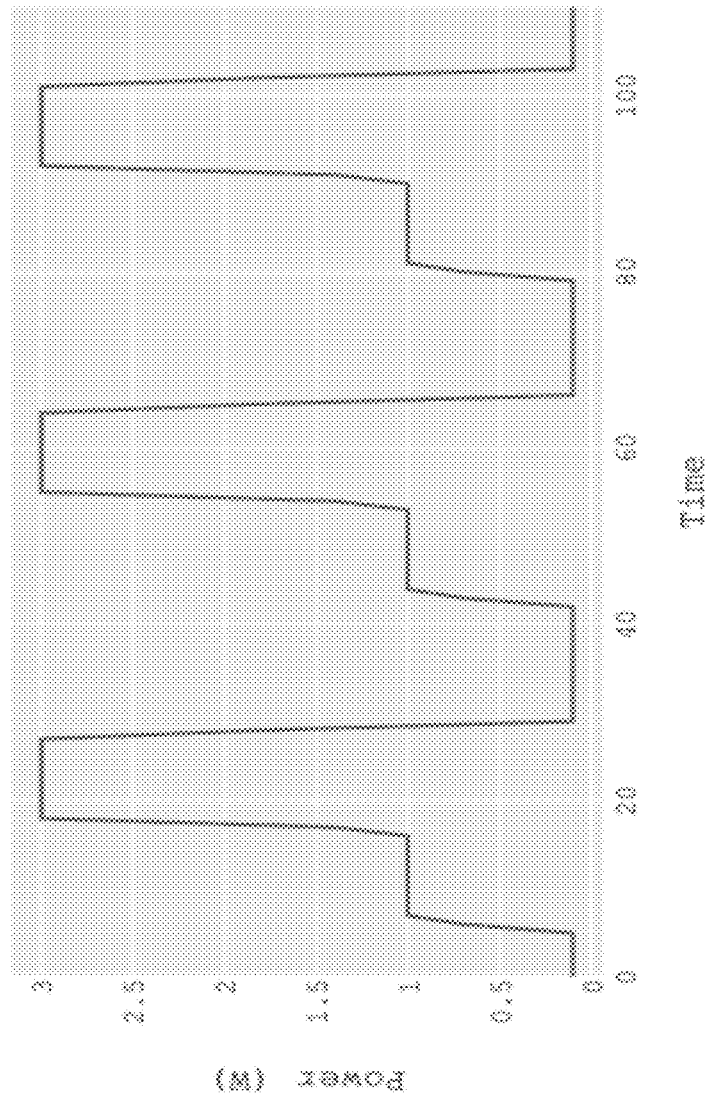
FIG. 4A is an illustration of an example of electrical data collected for a powered device.
Figure 4B:
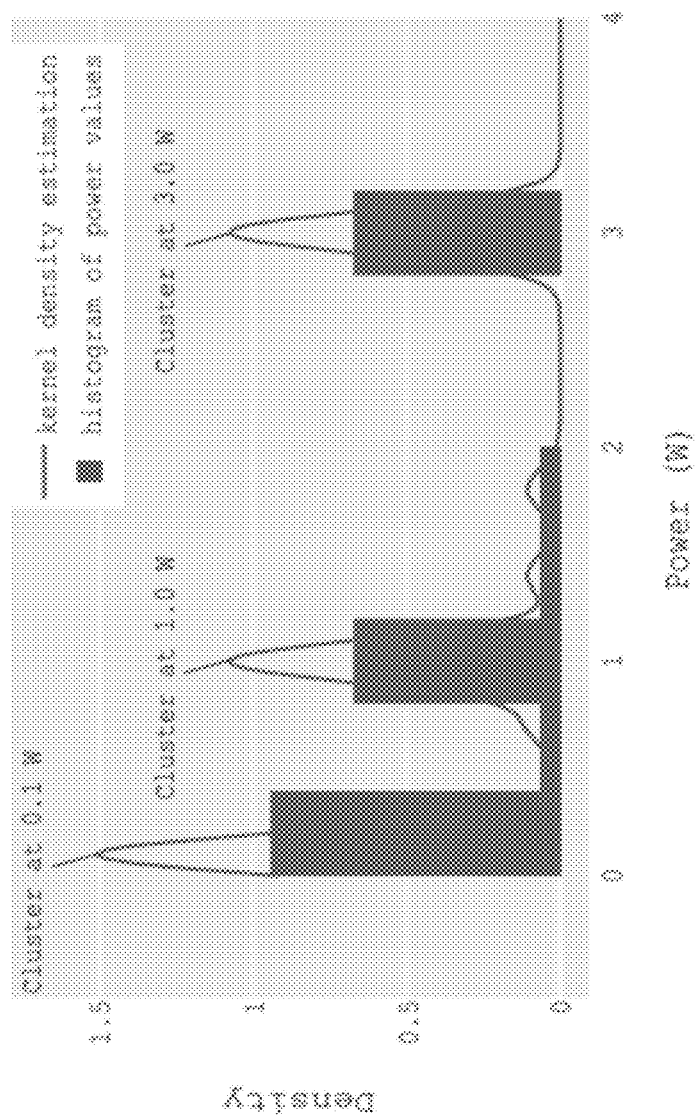
FIG. 4B is an illustration of an example of clusters modeled using electrical data collected for a powered device.

FIGS. 4A-B are illustrations of examples of data collected and modeled using a web application, for example, the web application 300 shown in FIG. 3. Referring first to FIG. 4A, an illustration of an example of electrical data collected for a powered device is shown by a graph 400. The graph 400 in particular shows a power curve in which the electrical data, indicating the power drawn by the subject powered device in terms of watts over some period of time, is represented in a time series. From this time series data, it is observed that there are three different power draw values at which plateaus appear in the power curve—a lowest at times when 0.1 watts are being drawn, a next lowest at times when 1 watt is being drawn, and another (i.e., in this case, a highest) at times when 3 watts are being drawn. Thus, the power data collected for the powered device indicates three different energy values at which the powered device most commonly operates.

Referring next to FIG. 4B, an illustration of an example of clusters modeled using electrical data collected for a powered device is shown by a graph 402. The graph 402 in particular shows a histogram of the energy values represented in the graph 400 shown in FIG. 4A and a distribution of those energy values determined using a kernel density estimation. The histogram, represented by the bars of varying height in the graph 402, may be computed by binning the energy values represented in the graph 400. The distribution of the energy values, represented by the curved line intersecting the histogram, represents a density of the energy values, which thus indicates the most common values of the energy values as shown by the histogram. As shown by the graph 402, a cluster is identified at each of the three most common values of the electrical data collected for the powered device. A first cluster is identified as corresponding to a lowest value of the most common values (e.g., 0.1 watts), a second luster is identified as corresponding to a next lowest value of the most common values (e.g., 1 watt), and a third cluster is identified as corresponding to the other value of the most common values (e.g., 3 watts). Because three clusters are identified for the electrical data collected for the powered device, it is inferred that the powered device has three operational states, in which the powered device is in an "off" operational state when it draws 0.1 watts, in an "on but not in-use" operational state when the powered device draws 1 watt, and in an "on and in-use" operational state when the powered device draws 3 watts.

The examples shown and described with respect to FIGS. 4A-B relate to a powered device determined to have three operational states (e.g., one "on and in-use" state, "on but not in-use" state, and one "off" state), such as a computer or television. However, in some cases, a powered device may be determined to have more than three operational states (e.g., one or more "on and in-use" states, one "on but not in-use" state, and one "off" state), such as a multi-speed fan. In other cases, a powered device may be determined to have two operational states (e.g., one "on and in-use" state and one "off" state), such as a toaster, space heater, or light bulb.

Figure 5:
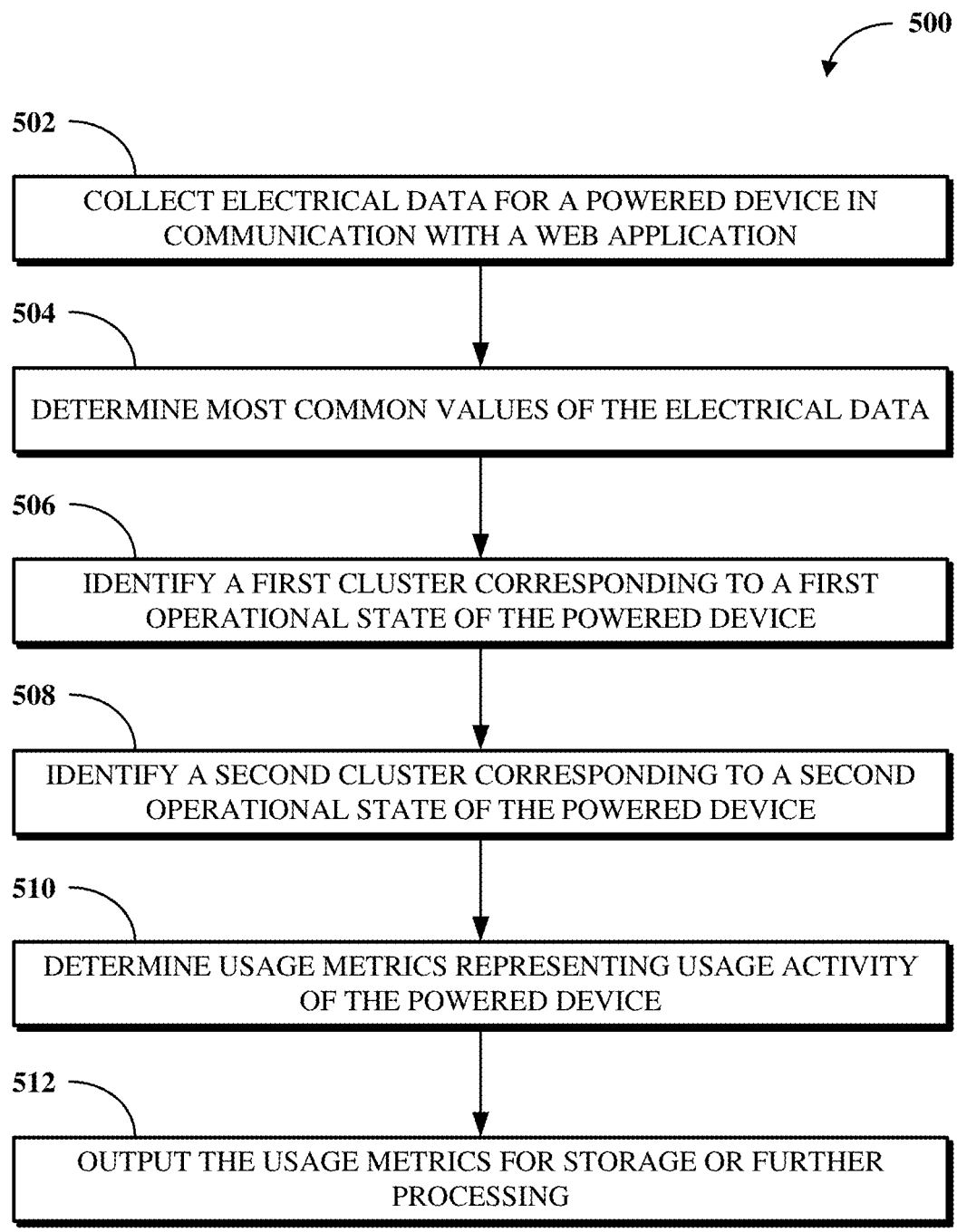
FIG. 5 is a flowchart of an example of a technique for powered device electrical data modeling and intelligence.

To further describe some implementations in greater detail, reference is next made to examples of techniques which may be performed by or using a powered device electrical data modeling and intelligence system as described with respect to FIGS. 1-3. FIG. 5 is a flowchart of an example of a technique 500 for powered device electrical data modeling and intelligence.

The technique 500 can be executed using computing devices, such as the systems, hardware, and software described with respect to FIGS. 1-3. The technique 500 can be performed, for example, by executing a machine-readable program or other computer-executable instructions, such as routines, instructions, programs, or other code. The steps, or operations, of the technique 500 or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 502, electrical data is collected for a powered device in communication with a web application of a system for powered device electrical data modeling and intelligence. The electrical data is represented in a time series format and indicates electrical data values and timestamps indicative of when electricity draws by the powered device occur. The powered device may be of a number of different possible devices types and located on its own or in a region, such as which region may be defined using the web application.

At 504, the most common values of the electrical data are determined using a kernel density estimation. The most common values are most common energy values representing the wattage most frequently drawn in the electrical data. Determining the most common values of the electrical data includes binning the energy values of the electrical data collected for the powered device into histograms. A kernel density estimation then processes the binned energy values by estimating a smooth and continuous distribution of the energy values corresponding to the histogram. At least two clusters, each corresponding to different operational states of the powered device, are identified as a result of the kernel density estimation, in which each of the clusters represents one of the most common values of the powered device.

Thus, at 506, a first cluster corresponding to a first operational state of the powered device is identified, and, at 508, a second cluster corresponding to a second operational state of the powered device is identified. The first cluster represents a lowest value of the most common values. As such, the first operational state is an off operational state. The second operational state, however, depends upon the number of most common values determined for the powered device. That is, when the most common values includes two values, the second cluster represents a value of the most common values other than the lowest value thereof and thus the second operational state is an on and in-use operational state. However, when the most common values of the electrical data includes three or more values, the second cluster represents a next lowest value of the most common values and the second operational state of the powered device is an on but not in-use operational state. In the latter case, there may further be a third cluster representing a third value of the most common values of the electrical data higher than the lowest value and the next lowest value, which third cluster corresponds to an on and in-use operational state. In some cases, there may be other clusters which also represent on and in-use operational states.

At 510, usage metrics representing usage activity of the powered device are determined. The usage metrics indicate the operational state for the powered device at a given point in a period of time over which the electrical data was collected. For example, the usage metrics may indicate that the powered device is actively in-use (e.g., because the operational state thereof is "on and in-use") during a certain time range, but not actively in-use (e.g., because the operational state thereof is "off" or "on but not in-use") during a different time range.

At 512, the usage metrics are output for storage or further processing. For example, the usage metrics may be stored in a data store accessible by the web application. Storing the usage metrics at the web application may, for example, include populating a truth table with information indicating the electrical data values associated with each of the clusters for the powered device. In another example, the usage metrics may be accessed to determine utilization information for the powered device. For example, the utilization information determined using the usage metrics may be used to generate or modify a rule for selectively delivering electricity to the powered device.

In some implementations, the technique 500 may further include determining smoothed average values of the electrical data for each of the one or more powered devices. For example, determining the smoothed average values of the electrical data can include first computing average values of the electrical data for each of the powered devices and then smoothing those average values using one or more filters. In some such implementations, the at least two clusters identified using the electrical data are identified using the smoothed average values. For example, a first cluster may represent a lowest value of the smoothed average values and a second cluster may represent a highest value of the smoothed average values.

In some implementations, the technique 500 may further include using machine learning to implement further functionality of the system for powered device electrical data modeling and intelligence. The further functionality implemented using machine learning may refer to one or more aspects which use the usage metrics. For example, the further functionality may include one or more of auto-labeling powered devices based on device type, deriving insights into business operation impact of powered devices, inferring occupancy for a region, predicting maintenance requirements for powered devices, and/or other functionality.

In some implementations, the usage metrics determined for the powered device may be used to infer an operational state of the powered device using second electrical data collected after the usage metrics are determined. The second electrical data may, for example, be pre-processed by averaging the electrical data values thereof and/or by smoothing such values using one or more filters prior to the further processing of the second electrical data. Alternatively, such pre-processing of the second electrical data may be omitted. A determination may be made based on the usage metrics that an electrical data value of the second electrical data corresponds to a particular cluster of the at least two clusters for the powered device. For example, determining that the electrical data value of the second electrical data corresponds to a particular cluster may include comparing the electrical data value to electrical data values represented within a truth table associated with the usage metrics.

In such an implementation, responsive to determining that the electrical data value of the second electrical data corresponds to the particular cluster, an indicator may be output to represent an in-use status of the powered device at the time when the second electrical data was collected. The indicator is thus based on an operational state corresponding to the particular cluster. For example, where a determination is made based on the usage metrics that the particular cluster to which the electrical data value of the second electrical data corresponds is a cluster representing a highest most common energy value for the powered device, the powered device may be determined to have been in-use at the time when the second electrical data was collected. In another example, where the determination instead indicates that the particular cluster is a cluster which represents a lowest most common energy value of the powered device, the powered device may be determined to have been off at that time.

Figure 6:
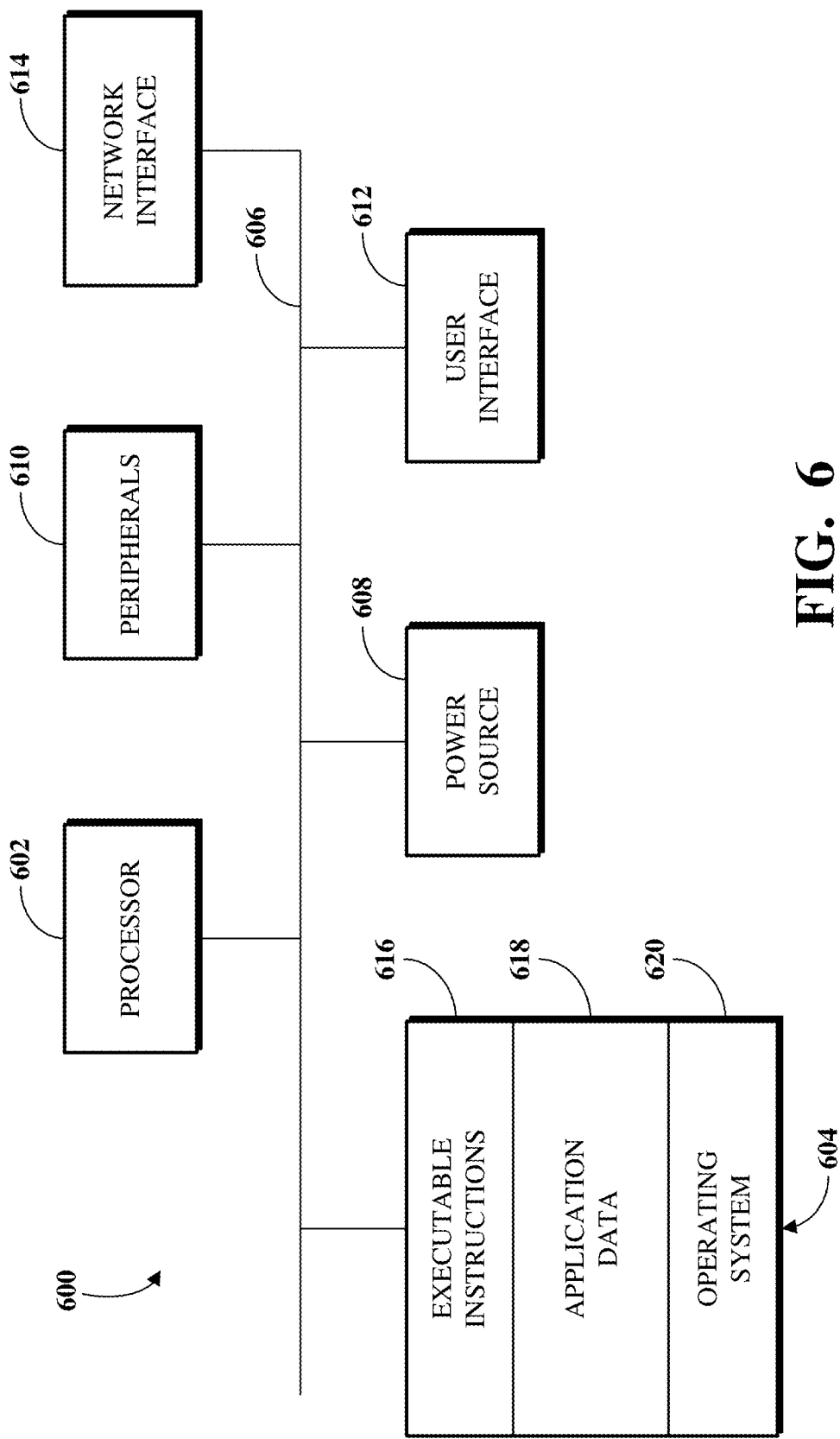
FIG. 6 is a block diagram of an example internal configuration of a computing device of a system for powered device electrical data modeling and intelligence.

FIG. 6 is a block diagram of an example internal configuration of a computing device 600 of a system for powered device electrical data modeling and intelligence, for example, the system 100 shown in FIG. 1. The computing device 600 may be used to implement a server on which a web application is run (e.g., the server 106 and the web application 108 shown in FIG. 1). Alternatively, the computing device 600 may be used to implement a client that accesses the web application (e.g., the client 118 shown in FIG. 1). As a further alternative, the computing device 600 may be used as or to implement another client, server, or other device according to the implementations disclosed herein.

The computing device 600 includes components or units, such as a processor 602, a memory 604, a bus 606, a power source 608, peripherals 610, a user interface 612, and a network interface 614. One of more of the memory 604, the power source 608, the peripherals 610, the user interface 612, or the network interface 614 can communicate with the processor 602 via the bus 606.

The processor 602 is a central processing unit, such as a microprocessor, and can include single or multiple processors having single or multiple processing cores. Alternatively, the processor 602 can include another type of device, or multiple devices, now existing or hereafter developed, configured for manipulating or processing information. For example, the processor 602 can include multiple processors interconnected in any manner, including hardwired or networked, including wirelessly networked. For example, the operations of the processor 602 can be distributed across multiple devices or units that can be coupled directly or across a local area or other suitable type of network. The processor 602 can include a cache, or cache memory, for local storage of operating data or instructions.

The memory 604 includes one or more memory components, which may each be volatile memory or non-volatile memory. For example, the volatile memory of the memory 604 can be random access memory (RAM) (e.g., a DRAM module, such as DDR SDRAM) or another form of volatile memory. In another example, the non-volatile memory of the memory 604 can be a disk drive, a solid state drive, flash memory, phase-change memory, or another form of non-volatile memory configured for persistent electronic information storage. The memory 604 may also include other types of devices, now existing or hereafter developed, configured for storing data or instructions for processing by the processor 602.

The memory 604 can include data for immediate access by the processor 602. For example, the memory 604 can include executable instructions 616, application data 618, and an operating system 620. The executable instructions 616 can include one or more application programs, which can be loaded or copied, in whole or in part, from non-volatile memory to volatile memory to be executed by the processor 602. For example, the executable instructions 616 can include instructions for performing some or all of the techniques of this disclosure. The application data 618 can include user data, data store data (e.g., files, database catalogs, or dictionaries), or the like. The operating system 620 can be, for example, Microsoft Windows®, Mac OS X®, or Linux®; an operating system for a small device, such as a smartphone or tablet device; or an operating system for a large device, such as a mainframe computer.

The power source 608 includes a source for providing power to the computing device 600. For example, the power source 608 can be an interface to an external power distribution system. In another example, the power source 608 can be a battery, such as where the computing device 600 is a mobile device or is otherwise configured to operate independently of an external power distribution system.

The peripherals 610 includes one or more sensors, detectors, or other devices configured for monitoring the computing device 600 or the environment around the computing device 600. For example, the peripherals 610 can include a geolocation component, such as a global positioning system location unit. In another example, the peripherals can include a temperature sensor for measuring temperatures of components of the computing device 600, such as the processor 602.

The user interface 612 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 614 provides a connection or link to a network (e.g., the network 116 shown in FIG. 1). The network interface 614 can be a wired network interface or a wireless network interface. The computing device 600 can communicate with other devices via the network interface 614 using one or more network protocols, such as using Ethernet, TCP, IP, power line communication, Wi-Fi, Bluetooth, infrared, GPRS, GSM, CDMA, Z-Wave, ZigBee, LoRaWAN, another protocol, or a combination thereof.

Implementations of the computing device 600 may differ from what is shown and described with respect to FIG. 6. In some implementations, the computing device 600 can omit the peripherals 610. In some implementations, the memory 604 can be distributed across multiple devices. For example, the memory 604 can include network-based memory or memory in multiple clients or servers performing the operations of those multiple devices. In some implementations, the application data 618 can include functional programs, such as a file store, a web browser, a web server, a database server, another program, or a combination thereof.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as Python, C, C++, Java, JavaScript, assembler, or the like, with the various algorithms being implemented with a combination of data structures, objects, processes, routines, or other programming elements, and elements within a data store can be retrieved using a querying language, such as SQL.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc.

Likewise, the terms "system" or "mechanism" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, at a web application and over a period of time, electrical data collected for a powered device at a first time, wherein the electrical data are received from a network-enabled electric plug;
   determining common values of the electrical data collected for the powered device;
   identifying a first cluster representing a lowest value of the common values of the electrical data, wherein the first cluster corresponds to a first operational state of the powered device, wherein the first cluster is identified using a first subset of the electrical data;
   identifying a second cluster representing another value of the common values of the electrical data, wherein the second cluster corresponds to a second operational state of the powered device, wherein the second cluster is identified using a second subset of the electrical data;
   determining usage metrics representing usage activity of the powered device based on the first cluster and the second cluster;
   determining, based on the usage metrics, a command for selectively controlling delivery of electricity to the powered device;
   transmitting the command to the network-enabled electric plug;
   populating a truth table with information indicating the common values of the electrical data collected for the powered device associated with the first cluster and the second cluster; and
   processing second electrical data based on the usage metrics to infer an operational state of the powered device at a second time after the first time,
   wherein the second electrical data is processed based on the usage metrics to infer the operational state of the powered device at the second time by comparing values of the second electrical data against the information within the truth table.

2. The method of claim 1, wherein the first operational state of the powered device is an off operational state,
   wherein, when the common values of the electrical data includes two values, the second operational state of the powered device is an on and in-use operational state, and
   wherein, when the common values of the electrical data includes three or more values:
      the second cluster represents a next lowest value of the common values of the electrical data and the second operational state of the powered device is an on but not in-use operational state, and
   a third cluster representing a third value of the common values of the electrical data higher than the lowest value and the next lowest value corresponds to a third operational state of the powered device, wherein the third operational state of the powered device is an on and in-use operational state.

3. The method of claim 1, wherein the electrical data collected for the powered device includes time series data indicating electrical usage measurements and timestamps indicative of the electrical usage measurements, and wherein determining the common values of the electrical data collected for the powered device comprises:

determining average electrical data values over a period of time based on the time series data; and smoothing the average electrical data values using one or more filters to eliminate spikes misrepresenting the average electrical data values.

4. The method of claim 3, wherein the first cluster and the second cluster are identified by processing the smoothed electrical data values using a kernel density function.

5. The method of claim 1, the method comprising:

determining a device type of the powered device based on power amount inferences according to the usage metrics; and responsive to second electrical data collected for a second powered device of the device type, automatically labeling the second powered device with the device type.

6. The method of claim 1, the method comprising:

determining a forecast of electricity usage for the powered device over a period of time based on the usage metrics.

7. The method of claim 1, the method comprising:

generating a rule for selectively controlling a delivery of electricity to the powered device according to the usage metrics by inferring usage patterns representative of patterns of operational states of the powered device over time.

8. The method of claim 1, wherein the electrical data is collected for the powered device using a web application configured to communicate with a network-enabled electric plug coupled to the powered device in a region defined at the web application.

9. The method of claim 8, wherein a plurality of network-enabled electric plugs are deployed within the region, wherein each network-enabled electric plug of the plurality of network-enabled electric plugs is coupled to one or more powered devices within the region, and wherein the web application is configured to collect electrical data for each of the one or more powered devices coupled to each network-enabled electric plug of the plurality of network-enabled electric plugs.

10. The method of claim 8, wherein the region includes one or more floors of a building or one or more areas of the one or more floors of the building.

11. A system, comprising:

a network-enabled electric plug configured to deliver electricity from an electricity source to a powered device, wherein the network-enabled electric plug is configured to a selectively control delivery of electricity to the powered device based on a command received from a server device; and the server device running a web application in communication with the network-enabled electric plug and configured to:

receive, over a period of time and from the network-enabled electric plug, electrical data collected for the powered device at a first time;

determine common values of the electrical data collected for the powered device;

determine two or more clusters corresponding to operational states of the powered device based on the common values, wherein the two or more clusters comprise a first cluster and a second cluster;

determine usage metrics representing usage activity of the powered device based on the two or more clusters;

transmit the command to the network-enabled electric plug, wherein the command is determined using the usage metrics;

populate a truth table with information indicating the common values of the electrical data collected for the powered device associated with the first cluster and the second cluster; and process second electrical data based on the usage metrics to infer an operational state of the powered device at a second time after the first time, wherein the second electrical data is processed based on the usage metrics to infer the operational state of the powered device at the second time by comparing values of the second electrical data against the information within the truth table.

12. The system of claim 11, wherein, to determine the two or more clusters corresponding to the operational states of the powered device based on the common values, the web application is configured to:

identify the first cluster representing a lowest value of the common values of the electrical data, wherein the first cluster corresponds to a first operational state of the powered device; and identify the second cluster representing another value of the common values of the electrical data, wherein the second cluster corresponds to a second operational state of the powered device.

13. The system of claim 12, wherein the first operational state of the powered device is an off operational state, wherein, when the common values of the electrical data includes two values, the second operational state of the powered device is an on and in-use operational state, and wherein, when the common values of the electrical data includes three or more values:

the second cluster represents a next lowest value of the common values of the electrical data and the second operational state of the powered device is an on but not in-use operational state, and a third cluster representing a third value of the common values of the electrical data higher than the lowest value and the next lowest value corresponds to a third operational state of the powered device, wherein the third operational state of the powered device is an on and in-use operational state.

14. The system of claim 11, wherein the web application is configured to:

determine a device type of the powered device based on power amount inferences according to the usage metrics; and responsive to second electrical data collected for a second powered device of the device type, automatically label the second powered device with the device type.

15. The system of claim 11, wherein the web application is configured to:

generate a rule for selectively controlling the delivery of electricity by the network-enabled electric plug to the powered device according to the usage metrics by inferring usage patterns representative of patterns of the operational states of the powered device over time.

16. A non-transitory computer readable medium storing instructions that, when executed by one or more processors, facilitate performance of operations, the operations comprising:

determining two or more clusters corresponding to operational states of a powered device based on common values of electrical data collected for the powered device at a first time;

populating a truth table with information indicating the common values of the electrical data collected for the powered device associated with a first cluster and a second cluster;

identifying usage metrics representing usage activity of the powered device and determined based on the two or more clusters;

determining, based on the usage metrics, a command for selectively controlling delivery of electricity to the powered device;

transmitting the command to a network-enabled electric plug; and processing second electrical data based on the usage metrics to infer an operational state of the powered device at a second time after the first time, wherein the second electrical data is processed based on the usage metrics to infer the operational state of the powered device at the second time by comparing values of the second electrical data against the information within the truth table.

17. The non-transitory computer readable medium of claim 16, wherein the two or more clusters include at least a first cluster representing a lowest value of the common values of the electrical data and a second cluster representing another value of the common values of the electrical data, wherein the first cluster corresponds to a first operational state of the powered device and the second cluster corresponds to a second operational state of the powered device, wherein the first operational state of the powered device is an off operational state, wherein, when the common values of the electrical data includes two values, the second operational state of the powered device is an on and in-use operational state, and wherein, when the common values of the electrical data includes three or more values:

the second cluster represents a next lowest value of the common values of the electrical data and the second operational state of the powered device is an on but not in-use operational state, and a third cluster representing a third value of the common values of the electrical data higher than the lowest value and the next lowest value corresponds to a third operational state of the powered device, wherein the third operational state of the powered device is an on and in-use operational state.

18. The non-transitory computer readable medium of claim 16, wherein the electrical data is collected for the powered device at a first time, the operations comprising:

processing second electrical data based on the usage metrics to infer an operational state of the powered device at a second time after the first time.

* * * * *